(12) United States Patent
Phillips

(10) Patent No.: US 6,922,912 B2
(45) Date of Patent: Aug. 2, 2005

(54) DRYING APPARATUS

(75) Inventor: Neil William Phillips, Redland (GB)

(73) Assignee: Dyson Limited, Wiltshire (GB)

( * ) Notice: Subject to any disclaimer, the term of this patent is extended or adjusted under 35 U.S.C. 154(b) by 0 days.

(21) Appl. No.: 10/476,027

(22) PCT Filed: Apr. 25, 2002

(86) PCT No.: PCT/GB02/01895
§ 371 (c)(1),
(2), (4) Date: Oct. 27, 2003

(87) PCT Pub. No.: WO02/088453
PCT Pub. Date: Nov. 7, 2002

(65) Prior Publication Data
US 2004/0143987 A1 Jul. 29, 2004

(30) Foreign Application Priority Data

Apr. 27, 2001 (GB) .............................. 0110324
Jul. 18, 2001 (GB) .............................. 0117548

(51) Int. Cl.⁷ ................................................ F26B 5/04
(52) U.S. Cl. .............................. 34/403; 34/406; 34/407
(58) Field of Search ......................... 34/361, 403, 406, 34/407, 408, 467, 468, 469, 470, 471

(56) References Cited

U.S. PATENT DOCUMENTS

| 2,440,416 A | 4/1948 | Proudfoot | |
| 3,010,216 A | * 11/1961 | Ravet | ............................. 34/92 |
| 4,347,671 A | * 9/1982 | Dias et al. | ..................... 34/402 |
| 5,459,945 A | * 10/1995 | Shulenberger | ................ 34/605 |

FOREIGN PATENT DOCUMENTS

| DE | 33 21 245 A1 | 12/1984 | |
| FR | 1.201.674 | 1/1960 | |
| GB | 2083190 A | * 3/1982 | ........... F26B/23/10 |

* cited by examiner

Primary Examiner—Kenneth Rinehart
(74) Attorney, Agent, or Firm—Morrison & Foerster LLP

(57) ABSTRACT

The invention provides drying apparatus including a first chamber for receiving articles to be dried and having an outlet, a second chamber having an outlet, and a fan having a fan inlet and a fan outlet, the fan inlet communicating with the outlet of the first chamber and the fan outlet communicating with the second chamber. The apparatus further includes a vacuum pump communicating with the outlet of the second chamber so that transfer of thermal energy can take place between the first and second chambers. The invention also provides a method of drying including placing articles into a first chamber, evacuating a significant proportion of the air from the first chamber and from a second chamber, evacuating water vapor from the first chamber to the second chamber, allowing the water vapor to condense in the second chamber, and transferring thermal energy from the second chamber to the first chamber.

13 Claims, 4 Drawing Sheets

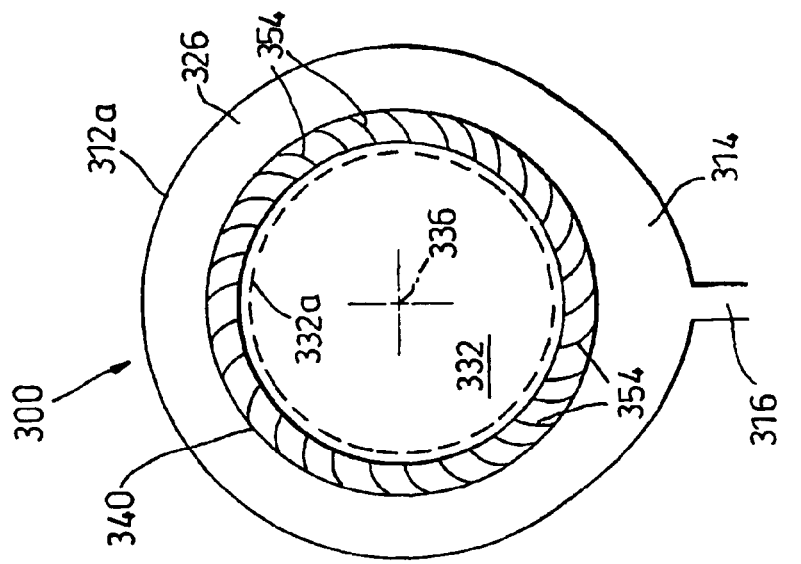
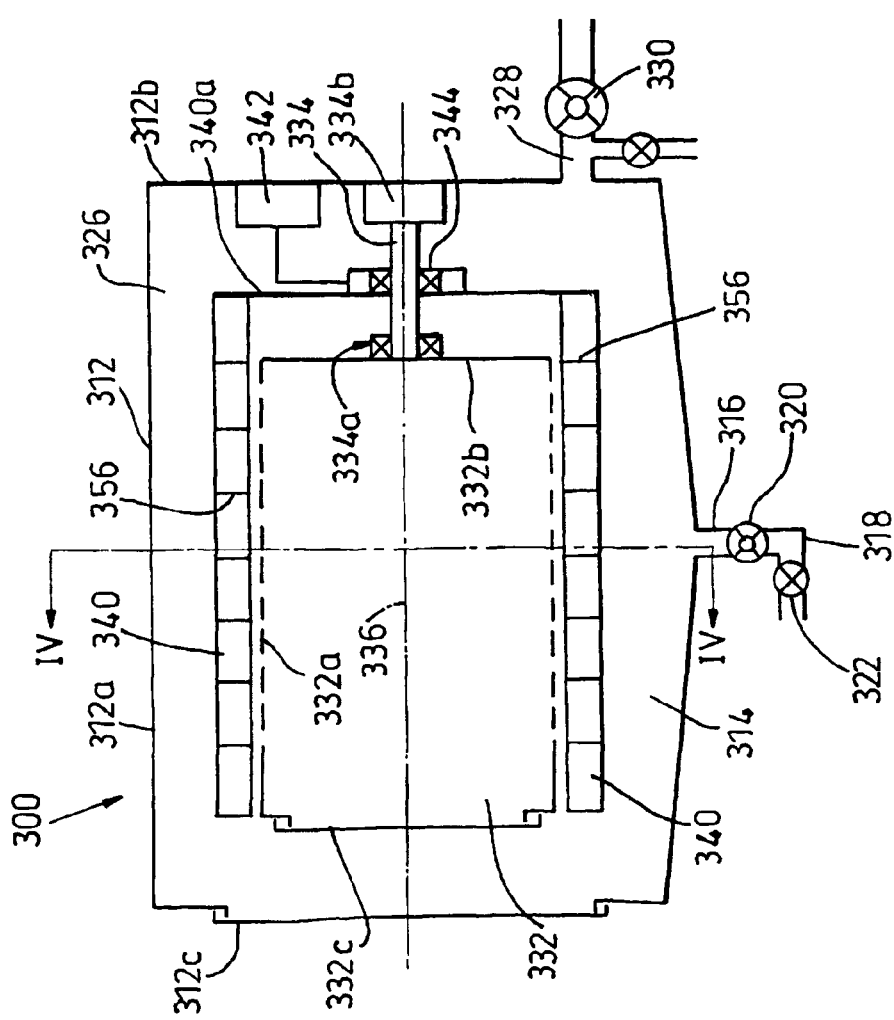
Fig. 4a
Fig. 4b

DRYING APPARATUS

FIELD OF THE INVENTION

The invention relates to drying apparatus and to a method of drying articles. Particularly, but not exclusively, the invention relates to domestic drying apparatus for drying laundry articles or kitchenware and crockery and to a method suitable for use in a domestic environment.

BACKGROUND OF THE INVENTION

Conventional methods of drying laundry articles involve tumbling the articles in a drum whilst a warm airstream is passed therethrough. The water trapped in the articles evaporates into the warm airstream and is carried out of the drum therewith. The water vapour is either released into the atmosphere or condensed out of the airstream and collected to be drained off. Conventional methods of drying articles in a dishwasher device also involve passing heated air over the articles to cause evaporation of the water lying on the articles and removing the water vapour with the airstream. The disadvantages of these methods include the fact that the articles to be dried are often subjected to high temperatures if a particularly fast drying time is required. In the case of clothes dryers, this can damage the fabric and, in the case of dishwashers, the crockery becomes too hot to handle as soon as the washing and drying cycle has finished.

It is a well known principle that water will boil at a temperature lower than 100° C. if the pressure in the vessel in which it is contained is reduced below atmospheric. Proposals for drying laundry articles based on this principle have been put forward but, to date, none has been found to be sufficiently effective to form the basis for a commercially-viable drying apparatus. The principal reason for this is that the vacuum pump by means of which the chamber containing the articles to be dried is evacuated is required to deliver very high flow rates, in order to be able to evacuate the evaporating water vapour, and to develop a high pressure drop thereacross. Such components, whilst available on the market, are prohibitively expensive for use in the context of domestic apparatus.

SUMMARY OF THE INVENTION

It is therefore an object of the present invention to provide drying apparatus capable of operating on the principle of reduced pressure so as to evaporate water vapour from articles at a temperature lower than 100° C. and which is more cost-effective than previously proposed arrangements. It is another object of the invention to provide drying apparatus which is suitable for use in the domestic environment. It is a further object of the invention to provide a method of drying articles based on the principle of reduced pressure so as to evaporate water vapour from articles at a temperature lower than 100° C. which is more cost-effective than previously proposed methods. It is a still further object of the invention to provide a method of drying articles which is suitable for use in the domestic environment.

The invention provides drying apparatus comprising a first chamber for receiving articles to be dried and having an outlet, a second chamber having an outlet, and a fan having a fin inlet and a fan outlet, the fan inlet communicating with the outlet of the first chamber and the fan outlet communicating with the second chamber, the apparatus further comprising a vacuum pump communicating with the outlet of the second chamber, the arrangement being such that transfer of thermal energy can take place between the first and second chambers and means are provided for causing forced circulation of water vapour contained within the first chamber.

The arrangement provided avoids the need to provide a vacuum pump capable of developing a high pressure drop and delivering a high flow rate. Essentially, the arrangement allows the first and second chambers to be evacuated after which the water vapour evaporated in the first chamber is condensed in the second chamber without being passed through the vacuum pump. Hence the vacuum pump is required to deliver only a relatively small volume of gas. As such, the cost of the components is kept to a minimum.

The arrangement also takes advantage of the fact that, when the water evaporates in the first chamber, it absorbs energy which, in the absence of any input of energy, causes a drop in temperature. Similarly, when the water vapour condenses in the second chamber, it releases energy. However, if the temperature in the first chamber drops significantly, the pressure reduction therein will need to be greater to ensure that the water in the articles is evaporated. Thus, the transfer of thermal energy from the second chamber to the first chamber maintains the temperature in the first chamber and allows the pressure in both chambers to be maintained at an achievable value without reducing the rate at which water can be evaporated in the first chamber.

An advantage provided by the invention, when used in the field of clothes dryers, is that effective drying can be carried out relatively quickly without subjecting the articles to be dried to excessively high temperatures. When used in the field of dishwashers, a similar advantage is that, at the end of the washing and drying process, the crockery and kitchenware are at a temperature which is not too hot to be handled immediately.

In a preferred arrangement, the first and second chambers have at least one common wall, with the or each common wall being thermally conductive. If the common wall is thermally conductive, it will remain at a lower temperature than the second chamber and so provide a surface on which the water vapour will readily condense. Also, the latent heat of condensation will then pass through the thermally conductive wall into the first chamber to maintain the temperature therein and so encourage the water therein to evaporate from the articles. This increases the efficiency of the apparatus as a whole.

Preferably, the first chamber is located partially, more preferably wholly, inside the second chamber. Such an arrangement maximises the area of the common wall available to the water vapour for condensation purposes.

It is also preferable, at least for applications in the laundry field, if the first chamber is mounted so as to be rotatable about an axis and means are provided for causing the first chamber to rotate about the axis. In an alternative embodiment, the first chamber may comprise an outer housing and an inner drum, with the outer housing being held stationary with respect to the second chamber and the inner drum being mounted so as to be rotatable with respect to the outer housing. In either case, the articles (which will be articles of laundry) can be tumbled within the first chamber so that different portions of the articles are caused to come into contact with the chamber or drum during the drying process. This reduces the risk of the articles being dried in some places and not others.

The alternative embodiment mentioned above can also include at least one vane or blade for causing circulation of air or water vapour within the first chamber when the drum is caused to rotate. This encourages the water vapour to pass across and through the articles to be dried and maximises evaporation of the water within the first chamber.

It is preferred that the apparatus is a clothes dryer or a dishwasher.

The invention also provides a method of drying articles comprising the steps of:

(a) placing the articles into a first chamber;
(b) evacuating a significant proportion of the air from the first chamber and from a second chamber;
(c) evacuating water vapour from the first chamber to the second chamber;
(d) allowing the water vapour to condense in the second chamber;
(e) transferring thermal energy from the second chamber to the first chamber; and
(f) causing forced circulation of the air and/or water vapour contained within the first chamber.

By transferring thermal energy from the second chamber to the first chamber, the method minimises energy consumption whilst maximising water evaporation in the first chamber. The power consumption required to operate the vacuum pump is also minimised.

In a preferred embodiment, the articles are tumbled or otherwise agitated during at least part of the drying process. This maximises the area of contact of the articles with a surface which is at a relatively high temperature and thus reduces the risk of areas of the articles remaining wet or damp.

Preferably, the air and/or water vapour in the first chamber is forced to circulate therein, more preferably through the articles themselves, so as to improve the removal, by evaporation, of water which might otherwise remain trapped within the articles.

BRIEF DESCRIPTION OF THE DRAWINGS

Embodiments of the invention will now be described, by way of example only, with reference to the accompanying drawings, wherein:

FIG. 4a is a schematic side sectional view through a fourth embodiment of the invention; and FIG. 4b is a transverse sectional view of the embodiment shown in FIG. 4a taken along the line IV—IV.

DETAILED DESCRIPTION OF THE INVENTION

Figure 1:
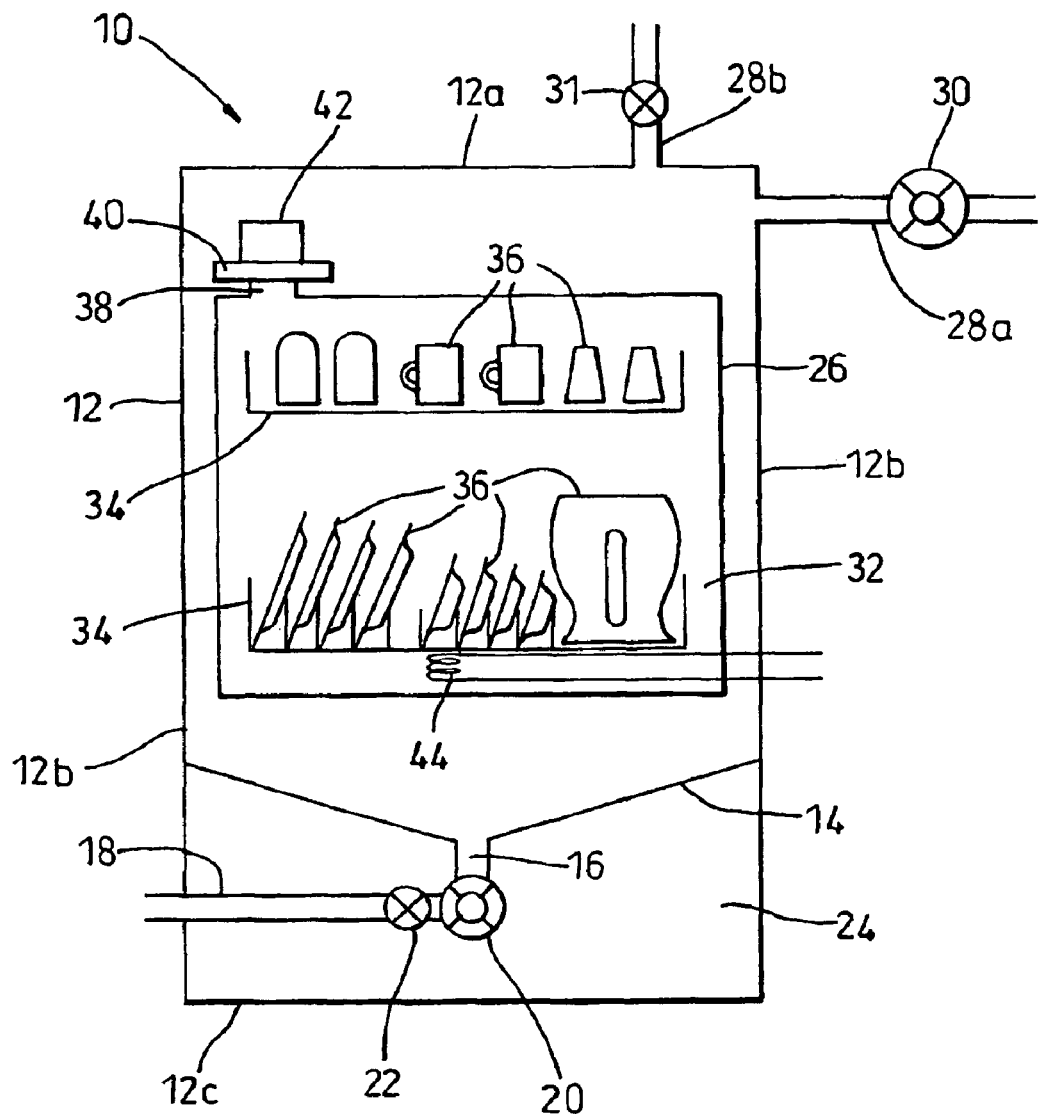
FIG. 1 is a schematic side sectional view through a first embodiment of the invention.

A first embodiment of the invention is illustrated in FIG. 1. In FIG. 1, the drying apparatus according to the invention takes the form of a dishwasher 10. The dishwasher 10 comprises an outer casing 12 having an upper wall 12a, side walls 12b and a base 12c. Suspended between the side walls 12b and sealingly attached thereto, is a tray 14 which is inclined downwardly towards an outlet 16. The outlet 16 is connected to a discharge pipe 18 which leads out of the dishwasher 10 and includes means (not shown) for connecting the discharge pipe 18 to a suitable drain for removing waste water from the dishwasher 10. A pump 20 and a one-way, non-return valve 22 are arranged between the outlet 16 and the discharge pipe 18 for reasons which will be explained below. The pump 20 and the non-return valve 22 are located and housed in a lower chamber 24 delimited by the tray 14, the base 12c and the lower portions of the side walls 12b.

An upper chamber 26 is delimited by the tray 14, the upper wall 12a and the upper portions of the side walls 12b. This upper chamber 26 is manufactured so as to be substantially airtight. Appropriate manufacturing and sealing techniques will be apparent to a skilled reader. A first outlet 28a communicates with the interior of the upper chamber 26 and leads to a vacuum pump 30 of the type which is capable of developing a relatively high pressure drop (say, 70–90 kPa) and delivering a relatively low flow rate (say, 0.5–1.0 l/s). A second outlet 28b also communicates with the interior of the upper chamber 26 and incorporates a valve 31 which allows the second outlet 28b to be closed or opened as required. The first and second outlets 28a, 28b each lead, beyond the vacuum pump 30 or the valve 31, to an appropriate location for discharging evacuated air from the dishwasher 10. It is envisaged that this location could be simply to atmosphere.

Located inside the upper chamber 26 is an inner chamber 32. The inner chamber 32 is sealed in an airtight manner from the upper chamber 26. The inner chamber 32 houses various items of racking 34 adapted and arranged to receive items of kitchenware and crockery 36 to be washed and dried by the dishwasher 10. The inner chamber 32 has an outlet 38 connected directly to the inlet of a blower 40. The blower 40 is connected to a motor 42 for driving the blower 40. The blower 40 is of a type which is capable of passing a relatively high volume of air per second (say, 12–45 l/s) and discharges directly into the upper chamber 26. A heater 44 is located in the inner chamber 32 immediately beneath, or directly in contact with, the lowermost racking item 34 for purposes which will be described below.

The inner chamber 32 is located wholly within the upper chamber 26. Hence, the walls of the inner chamber 32 form the innermost boundaries of the upper chamber 26. The walls of the inner chamber 32 are thus common to both the inner chamber 32 and the upper chamber 26. The walls of the inner chamber 32 are made from a suitable metal or other thermally-conductive material.

It will be understood that the dishwasher 10 will further comprise known components required for effecting a washing action. The components described above are required in order to effect drying of the kitchenware and crockery 36 which have previously been washed in the dishwasher 10. However, further description of the components required to carry out the washing process will not be described any further here.

The drying operation of the dishwasher 10 will now be described. Following the completion of the washing cycle, a significant quantity of water will remain inside the inner chamber 32, particularly on the surfaces of the kitchenware and crockery 36. The temperature of the contents of the inner chamber 26 is likely to be in the region of 20° C. A drying process is required in order to complete the washing and drying process. In order to achieve this, the blower 40 is operated so as to draw air from the inner chamber 32 into the upper chamber 26 at a relatively high rate. The valve 31 is also opened so that the air in the upper chamber 26 is emitted from the dishwasher 10. This occurs as a result of the increase in pressure in the upper chamber 26 which inevitably. occurs when air is drawn from the inner chamber 32 by the blower 40 and passed to the upper chamber 26. When a significant proportion of the air in the inner chamber 32 has been removed therefrom by the blower 40, the valve 31 is closed. If desired, the blower 40 can be turned off so that the pressures within the inner and upper chambers 32, 26 can be allowed to equalise. The blower 40 is then reactivated and the valve 31 opened again so as to allow more air to be expelled from the upper chamber 26. This process can be repeated several times if desired. At the end of this process, the valve 31 is closed, and the vacuum pump 30 is activated so as to evacuate the upper chamber 26 to a pressure which is significantly lower than atmospheric. By this method, a pressure of around 10 kPa should be achievable within the inner chamber 32 in a relatively short space of time. The water contained within the inner chamber 32 will remain in liquid form at this pressure and at a temperature of around 20° C.

Once the desired reduced pressure has been achieved, the heater 44 is turned on. This causes the temperature inside the inner chamber 32 to rise which, in turn, causes the water to evaporate at a temperature which is much lower than 100° C. The temperature at which the water begins to boil will depend upon the pressure of the air inside the inner chamber 32. In the embodiment, it is envisaged that the temperature inside the inner chamber 32 will be raised to around 50° C. As the water in the inner chamber 32 begins to evaporate, the blower 40 removes the water vapour from the inner chamber 32 and transfers it to the upper chamber 26. However, the transfer of the water vapour from the inner chamber 32 to the upper chamber 26, which is at a higher pressure than the inner chamber 32, encourages condensation of the water vapour. The water vapour thus condenses on the walls of the inner chamber 32.

It will be understood that, when the water evaporates in the inner chamber 32, it absorbs energy and the tendency will be for the temperature inside the inner chamber 32 to drop below the desired temperature of 50° C. Also, as the water vapour condenses in the upper chamber 26, its latent heat of condensation is given out, thus causing a rise in temperature in the upper chamber 26. In the steady state, therefore, the temperature of the water vapour in the upper chamber 26 will be greater than the temperature in the inner chamber 32 and there will be a temperature differential across the walls of the inner chamber 32, which are in fact common to both chambers 26,32. This allows thermal energy to pass back through the walls of the inner chamber 32 from the upper chamber 26 into the inner chamber. This transfer of thermal energy helps to prevent the temperature inside the inner chamber 32 from dropping to a very low temperature without the continued application of heat from the heater 44. If no heat were transferred into the inner chamber 32, the temperature would drop back to a comparatively low value (say, 20° C) and there would be no further evaporation of water at the selected pressure inside the inner chamber 32. A further reduction in the pressure inside the inner chamber 32 would be required if any further evaporation were to take place. If the pressure drop requirements are too great, then the vacuum pump 30 will need to be capable of developing a very high vacuum and apparatus of this sort is generally very expensive.

In the steady state, therefore, the blower 40 and vacuum pump 30 are operating, the valve 31 is closed and the heater 44 is either off or activated on a very low output. The pressure inside the inner chamber 32 will be lower than that in the upper chamber 26 and the temperature inside the inner chamber 32 will be lower than that in the upper chamber 36. There will be a temperature differential across the walls of the inner chamber 32. In one example of the apparatus illustrated above, the estimated steady-state pressure inside the inner chamber 32 is approximately 12–14 kPa and the temperature therein will be approximately 50° C. In the upper chamber 26, the pressure will be approximately 20–25 kPa and the temperature will be approximately 60–65° C. In the inner chamber 32, whilst liquid water remains therein, water will continue to evaporate and the water vapour will be extracted therefrom and passed to the upper chamber 26. The water vapour will condense on the walls of the inner chamber 32, from where it will fall onto the tray 14 and be collected at the outlet 16. At the end of the washing(ringing cycle, the pump 20 is operated in order to remove the condensed water from the dishwasher 10. If required, the condensed water can be stored for use in a subsequent dishwashing cycle.

Figure 2:
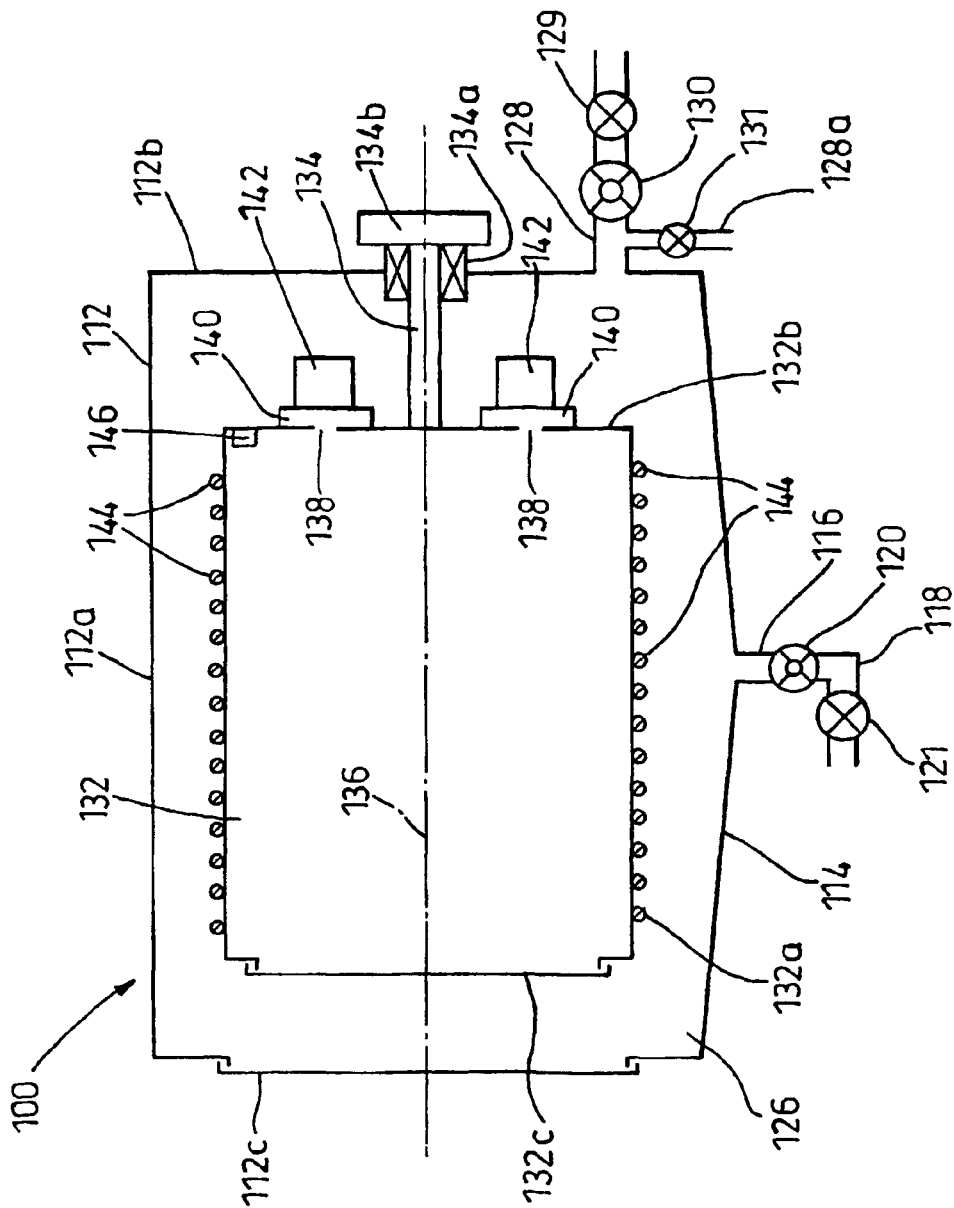
FIG. 2 is a schematic side sectional view through a second embodiment of the invention.

A second embodiment of apparatus according to the invention is illustrated in FIG. 2. In this embodiment, the apparatus takes the form of a tumble dryer or clothes dryer 100. The clothes dryer 100 has an outer casing 112 which may be generally cylindrical in shape. The outer casing 112 has a cylindrical wall 112a, a rear wall 112b and a door 112c arranged opposite the rear wall 112b. The door 112c is hinged so as to be openable so as to allow access to the interior of the clothes dryer 100. Appropriate seals are provided around the door 112c in order to allow the interior of the clothes dryer 100 to be evacuated as will be described below. The lower portion of the cylindrical wall 112a is shaped in the manner of a sump 114 and inclined towards an outlet 116. As described above, the outlet 116 is connected to a discharge pipe 118 with a pump 120 located therebetween and a one-way, non-return valve 119 located in the discharge pipe 118.

An outer chamber 126 is defined and delimited by the outer casing 112. An outlet 128 communicates with the outer chamber 126 and with a one-way, non-return valve 129 and a vacuum pump 130 located in the outlet 128. A spur outlet 128a communicates with the outlet 128 and has a valve 131 located therein. As before, both the outlet 128 And the spur outlet 128a lead to a location (not shown) at which air evacuated from the clothes dryer 100 can be safely and easily released, eg. into the atmosphere. Inside the outer chamber, a cylindrical inner chamber 132 is provided. The inner chamber 132 has a cylindrical wall 132a, a rear wall 132b and a door 132c located opposite the rear wall 132b. Seals are provided around the door 132c which will allow the inner chamber 132 to be evacuated to a pressure lower than that of the outer chamber 126. The inner chamber 132 is located within the outer chamber 126 so that the doors 112c, 132c are substantially aligned This allows both doors 112c, 132c to be opened in order to allow articles of laundry to be introduced to the interior of the inner chamber 132 so that the drying process can be carried out.

Mounted on the rear wall 132b of the inner chamber 132 are a plurality of blowers 140 and motors 142. The blowers 140 and motors 142 are equispaced about the axis 136 so that the mass of these components is balanced. Apertures 138 are provided in the rear wall 132b adjacent each blower 140. The apertures 138 form outlets from the inner chamber 132 so that water vapour can be evacuated from the inner chamber 132 and transferred into the outer chamber 126 via the blowers 140. Each blower 140 discharges water vapour directly into the outer chamber 126. Also provided on the cylindrical wall 132a is a heating element 144, preferably in the form of a film heater wrapped around the cylindrical wall 132a, appropriate insulation (not shown) being provided if required.

The inner chamber 132 is supported on a shaft 134 which, in turn, is rotably mounted, by means of bearings 134a, on the rear wall 112b of the outer casing 112. A motor 134b is provided so that when the motor 134b is activated, the inner chamber 132 is caused to rotate about its longitudinal axis 136. The axis 136 may be, but need not be, coincident with the longitudinal axis of the cylindrical wall 112a of the outer casing 112.

It will be appreciated that an appropriate electrical connection will need to be provided to the motors 142 so as to allow the inner chamber 132 to rotate about the axis 136. An electrical connection to the heating element 144 will also be required. Such rotatable connections are available but can be replaced, if desired, by other arrangements by means of which water vapour can be evacuated from the inner chamber 132 into the outer chamber 126 whilst the inner chamber 132 is rotating about the axis 136.

The clothes dryer 100 described above operates as follows. Articles of laundry requiring to be dried are introduced to the interior of the inner chamber 132 via the doors 112c, 132c. Thereafter, the doors 132c, 112c are closed. The blowers 140 are then operated with the valve 128a open so as to evacuate air from the inner chamber 132 into the outer chamber 126 and thence to atmosphere. When the majority of the air has been evacuated from the inner chamber 132, the valve 131 is closed and the vacuum pump 130 is operated so as to evacuate the outer chamber 126 to a pressure of between 20 and 25 kPa. The heater 144 is then turned on so as to raise the temperature of the contents of the inner chamber 132. As the temperature of the contents of the inner chamber 132 is being raised, the motor 134b is operated so as to cause the inner chamber 132 to rotate about the axis 136. If the speed of rotation is above that at which the laundry articles are held against the cylindrical wall 132a of the inner chamber 132, heat will be readily and easily passed from the cylindrical wall 132a to the laundry articles. At a speed lower than that at which the laundry articles will remain held against the cylindrical wall 132a, the laundry articles will be tumbled inside the inner chamber 132. This maximises the opportunity for the water droplets trapped within the laundry articles to be released into the low pressure atmosphere within the inner chamber 132. Periods of rotation at a speed which causes tumbling or redistribution of the laundry articles inside the inner chamber 132, ideally no more than 50 rpm, can be alternated with periods of rotation at a higher speed whilst the temperature of the contents of the inner chamber 132 is increased to the desired temperature.

Water droplets trapped within the fibres of the laundry articles will begin to evaporate inside the inner chamber 132 as the temperature within the inner chamber 132 increases. The temperature at which the water droplets will evaporate will depend upon the pressure inside the inner chamber 132. Spinning the inner chamber 132 at a high speed can also help to extract water from the laundry articles. The blowers 140 remain activated as the water evaporates so as to move the water vapour from the inner chamber 132 into the outer chamber 126. The compression of the water vapour as it passes through the blowers 140 and enters the outer chamber 126 encourages condensation on the walls of the inner chamber 132. The condensed water collects in the sump 114 and is discharged through the outlet 116 and discharge pipe 118 by way of the pump 120.

The cylindrical wall 132a of the inner chamber 132 is manufactured from a thermally-conductive material so that, as previously, at least some of the latent heat of condensation given off by the condensing water vapour is transferred through the cylindrical wall 132a into the inner chamber 132. This heat energy is passed to the laundry articles in the inner chamber 132. Continued rotation of the inner chamber 132 discourages localised warming and also allows water to be evaporated from all areas of the laundry articles. In this way, different areas of the laundry articles come into contact with the warmed cylindrical wall 132a of the inner chamber 132 at different times.

A particular advantage of the arrangement illustrated above is that of being able to detect when the drying process is complete. Whilst water remains present in the inner chamber 132, the water will continue to evaporate in an ongoing manner. Hence, although the blowers 140 continue to remove water vapour from the inner chamber 132, the pressure therein will remain relatively constant. However, once substantially all of the water has evaporated, continued operation of the blowers 140 will cause a reduction in the pressure inside the inner chamber 132. A simple pressure detector 146 located inside the inner chamber 132 can therefore be used to give an indication that the drying process is essentially complete. Alternatively, a sensor (not shown) can be provided to detect a significant increase in the speed of the blower 140 and/or a reduction in the power absorbed by the blower 140. This can also be used to provide An indication that the drying process is complete.

Figures 3A, 3B:
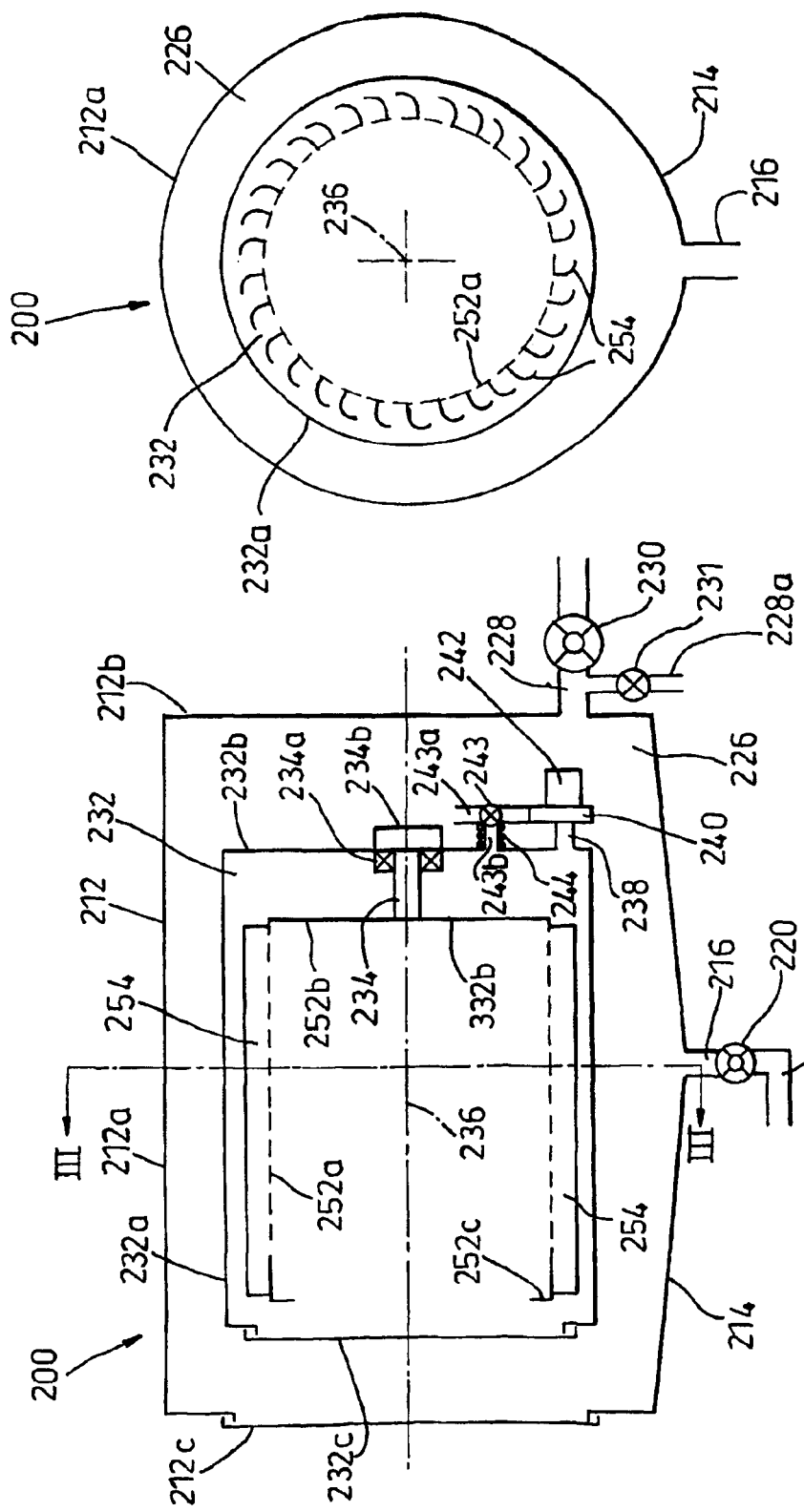
FIG. 3a is a schematic side sectional view through a third embodiment of the invention.
FIG. 3b is a transverse sectional view of the embodiment shown in FIG. 3a taken along the line III—III.

The third embodiment illustrated in the drawings is a variation on the second embodiment illustrated in FIG. 2. FIG. 3a is a schematic side view of the third embodiment, similar to the side view shown in FIG. 2, and FIG. 3b is a sectional view through the apparatus shown in FIG. 3a.

The outer chamber of the clothes dryer 200 illustrated in FIGS. 3a and 3b is very similar to that shown in FIG. 2 and described above. Hence, the clothes dryer 200 has an outer casing 212 having a cylindrical wall 212a, a rear wall 212b and a door 212c located opposite the rear wall 212b. As before, the door 212c is sealed in an airtight manner against the remainder of the outer casing 212 when it is closed. The outer casing 212 has a sump 214 in the lower region thereof, which sump 214 has an outlet 216 leading to a discharge pipe 218 via a pump 220. The outer casing 212 delimits the outer chamber 226 which communicates with an outlet 228 leading to a vacuum pump 230 and a spur outlet 228a incorporating a valve 231. Thus far, the features of the clothes dryer 200 are the same as the corresponding features of the clothes dryer 100 illustrated in FIG. 2.

The clothes dryer 200 also has an inner chamber 232 located inside the outer chamber 226. However, in contrast to the rotatable inner chamber 132 of the clothes dryer 100, the inner chamber 232 of the present embodiment is rigidly mounted inside the outer chamber 226. The inner chamber 232 has a cylindrical wall 232a, a rear wall 232b and a door 232c located remote from the rear wall 232b. As before, the door 232c is sealed against the remainder of the inner chamber 232 in an airtight manner when it is closed. A blower 240 is mounted close to the rear wall 232b of the inner chamber 232. A motor 242 is provided in order to power the blower 240. A conduit 238 leads from the rear wall 232b to the blower 240 for carrying gas (water vapour) from the interior of the inner chamber 232 to the blower 240 when the motor 242 is activated. The outlet of the blower 240 leads to a three way valve 243 which is able to direct gas leaving the blower 240 along one of two passageways. The first passageway 243a opens into the outer chamber 226. The second passageway 243b leads back into the inner chamber 232 and has a heating element 244 coiled thereabout. The heating element 244 can be used to warm the gas passing along the second passageway 243b.

Mounted inside the inner chamber 232 is a rotatable drum 250. The drum 250 has a perforated cylindrical wall 252a and a circular rear wall 252b which can also be perforated if desired. An inwardly extending lip 252c surrounds the edge of the cylindrical wall 252a on the side remote from the rear wall 252b. The drum 250 is located inside the inner chamber 232 so that the opening defined by the lip 252c is substantially in line with the door 232c of the inner chamber 232.

A shaft 234 is rigidly attached to the rear wall 252b of the drum 250. The shaft 234 is rotatably mounted by way of bearings 234a on the rear wall 232b of the inner chamber 232. A motor 234b is provided to enable the drum 250 to be rotated about the axis 236. The axis 236 is coincident with the longitudinal axis of the drum 250 and preferably also coincident with the longitudinal axis of the inner chamber 232.

As has been previously mentioned, the cylindrical wall 252a of the drum 250 is perforated. The perforations are sufficiently small to retain the laundry items to be dried inside the drum 250. The lip 252c also assists in retaining the laundry articles in the interior of the drum 250 when it is rotated about the axis 236 on actuation of the motor 234b. The door 323c is located and arranged so as to retain the laundry articles inside the drum 250.

A plurality of vanes 254 are arranged on the external surface of the cylindrical wall 252a of the drum 250. The vanes 254 extend axially along the length of the drum 250, parallel to the axis 236. As can be seen in FIG. 3b, each vane 254 is curved in profile. As the drum 250 is caused to rotate the vanes 254 bring about forced circulation of the water vapour present within the inner chamber 232 and it is preferred that their shape and profile will be selected so as to effect good circulation within the inner chamber 232.

In operation, as before, the laundry articles to be dried are placed inside the drum 250. The doors 212c and 232c are used to achieve this. Once the doors 212, 232c have been closed, the blower 240 is activated so as to remove air from the interior of the inner chamber 232, In order to achieve this, the three way valve 243 is set so as to pass the incoming air along the first passageway 243a, ie the air is removed from the inner chamber 232 and passed into the outer-chamber 226. The valve 231 is open to allow the air removed from the inner chamber 232 to be discharged from the dryer 200. Once the majority of the air has been removed from the inner chamber 232 in this way, the valve 231 is closed and the vacuum pump 230 is actuated so that the outer chamber 226 and the inner chamber 232 are both evacuated.

At this stage, the three way valve 243 is switched to a position in which gas leaving the blower 240 is directed along the second passageway 243b and the heating element 244 is turned on. The gas now moved by the blower 240 will simply be circulated through the blower and along the second passageway 243b, thus causing the said gas to be warmed by the heating element 244. The temperature of the contents of the inner chamber 232 thus rises and the water contained within the inner chamber 232 will, at a temperature dependent upon the pressure within the inner chamber 232, begin to evaporate. When the desired temperature of the inner chamber 232 has been reached, the three way valve 243 is returned to the position in which water vapour leaving the blower 240 is passed to the outer chamber 226. Hence the blower 240 will remove the water vapour from the inner chamber 232 to the outer chamber 226. Because of the inevitable temperature difference between the inner chamber 232 and the outer chamber 226, the water vapour condenses in the outer chamber 226, most probably on the outer wall of the inner chamber 232, giving out the latent heat of condensation as condensation takes place and causing the wall of the inner chamber 232 to become warmed. The condensed water will collect in the sump 214 and be removed therefrom via the outlet 216 and the discharge pipe 218 using the pump 220.

In order to ensure that all parts of the laundry articles are exposed to air and water vapour during this process, the drum 250 in which the laundry articles are contained is rotated about the axis 236. This is brought about by actuation of the motor 234b which causes rotation of the shaft 234 and thus rotation of the drum 250. The speed of rotation of the drum 250 is such that the laundry articles perform a tumbling action inside the drum 250.

In order to further enhance the ability of the above-described apparatus to remove all water droplets from the laundry articles, means are provided for forcing the water vapour, and any remaining air, contained within the inner chamber 232 to circulate. This is achieved by the presence of the vanes 254 on the external surface of the drum 250. Rotation of the drum 250, and therefore of the vanes 254, causes movement of the air and water vapour in a radial then axial, direction between the drum 250 and the cylindrical wall 232a of the inner chamber 232. This in turn forces the air and water vapour to circulate to the interior of the drum 250 and, having no other exit route, the air and water vapour then passes through the laundry articles contained within the drum 250 and out of the drum 250 through the perforations in the cylindrical wall 252a. At this stage, it is advantageous if the drum 250 is rotated about the axis 236 at a speed which forces the laundry articles to be held against the cylindrical wall 252a. This enhances the evaporation of water droplets retained within the textile articles because, as will be appreciated, the circulating air and water vapour will be warmed as it passes alongside the cylindrical wall 232a of the inner chamber 232 and the circulation of the air and water vapour causes the transfer of thermal energy from the cylindrical wall 232a into the textile articles which are to be dried, The presence of the vanes 254 along the length of the drum 250 has the advantage that the air and water vapour is forced to flow more uniformly through the laundry articles than if it were simply blown into the interior of the drum 250 from outside and allowed to follow the path of least resistance through the fabric.

FIGS. 4a and 4b illustrate a fourth embodiment of the invention. In this embodiment, the drying apparatus is, once again, a clothes dryer 300 having an outer casing 312. The outer casing 312 consists of a generally cylindrical wall 312a, a rear wall 312b and a door 312c located opposite the rear wall 312b. As in previous embodiments, the cylindrical wall 312a is shaped so that a sump 314 is formed in the lower region of the outer casing 312. An outlet 316 is provided at the lowest point of the sump 314 so that condensed water can be passed to a discharge pipe 318 via a pump 320 and a non-return valve 322. The outer casing 312 delimits an outer chamber 326 which has an outlet 328 incorporating a vacuum pump 330, similar to the arrangements described above.

An inner chamber 332 is arranged wholly within the outer chamber 326. The inner chamber 332 is generally cylindrical in shape and has a substantially cylindrical wall 332a, a rear wall 332b and a door 332c located opposite the rear wall 332b. As previously, the doors 312c, 332c are aligned so as to allow laundry articles to be introduced to the interior of the inner chamber 332. The cylindrical wall 332a is perforated for reasons which will be described below. The inner chamber 332 is mounted on a shaft 334 via bearings 334a. A motor 334b is provided so as to allow the inner chamber 332 to be rotated about the axis 336.

A fan array 340 is provided radially outwardly of the inner chamber 332. The fan array 340 comprises a multiplicity of vanes 354 which extend parallel to the longitudinal axis 336 of the inner chamber 332. A plurality of dividing walls 356 are provided at intervals along the length of the vanes 354 for reasons which will be described below. A support wall 340a is provided at one end of the fan array 340 to allow the fan array 340 to be supported via bearings 344 about the shaft 334. A second motor 342 is provided to enable the fan array 340 to be rotated at relatively high speed about the axis 336. As can be seen from FIG. 4b, the vanes 354 are concave in profile.

The operation of the clothes dryer 300 is similar to that of those described above. In order to evacuate air from the interior of the inner chamber 332, the fan array 340 is rotated at high speed (for example 2,000 rpm). This creates a low pressure immediately outside the cylindrical wall 332a of the inner chamber 332. Air thus passes through the perforations in the cylindrical wall 332a and is expelled from the outer chamber 326 via the outlet 328. The fan array 340 speeds up as air is expelled from the outer chamber 326. The vacuum pump 330 is then operated in order to evacuate the inner and outer chambers 332, 326 until the pressure in the inner chamber 332 has been reduced to a value of 12–14 kPa.

During the drying process, the inner chamber 332 is rotated about the shaft 334 at speeds which will allow tumbling of the laundry articles inside the inner chamber 332 or at speeds which will hold the laundry articles against the cylindrical wall 332a. Most preferably, periods of rotation at different speeds will be provided sequentially as has been outlined above. Meanwhile, the fan array 340 continues to rotate at a relatively high speed (of the order of 10,000 rpm) in order to draw air and water vapour from the interior of the inner chamber 332 through the perforations in the cylindrical wall 332a and into the outer chamber 326. The water vapour condenses in the outer chamber 326, collects in the sump 314 and, at an appropriate time, is discharged through the outlet 316 and the discharge pipe 318. The dividing wails 356 arranged along the length of the vanes 354 help to ensure that the flow of water vapour from the inner chamber 332 to the outer chamber 326 is spread reasonably uniformly along the cylindrical wall 332a of the inner chamber 332.

Means for heating the contents of the inner chamber 332 have been omitted from FIGS. 4a and 4b for the sake of clarity. However, it will be understood that some form of heating means may be required in order to ensure that the water contained within the inner chamber 332 will evaporate.

In order to allow heat energy to be transferred from the outer chamber 326 back into the inner chamber 332, part of the air/water vapour mixture pumped into the outer chamber 326 by the fan array 340 is allowed to circulate back into the inner chamber 332. This recirculated gas is at an elevated temperature because of the fact that the latent heat of condensation is given off by the condensing water vapour in the outer chamber 326. The recirculation is facilitated by the previously mentioned perforations in the cylindrical wall 332a. Part of the heat carried by the recirculated gas is transferred into the water still remaining in the laundry articles located within the inner chamber 332, which facilitates continued drying by causing evaporation of the said water in the inner chamber 332. The ratio of air to water vapour present in the recirculated gas, and/or the ratio of recirculated gas to condensed water vapour, can be adjusted so as to optimise the drying performance of the clothes dryer 300. In order to regulate the amount of recirculated gas, an adjustable valve can be provided in a single aperture in the cylindrical wall 332a in place of the previously mentioned perforations. The amount of air remaining in the clothes dryer 300 can be adjusted by operating the vacuum pump 330 for different periods of time during the drying process. This in turn will affect the air to water vapour ratio within the recirculated gas.

It will be appreciated that the invention is not intended to be limited to the precise details of the embodiments described above. Firstly, the invention is not intended to be limited to use in dishwashers and tumble dryers. Other uses will be apparent to a skilled reader. Secondly, the heaters described above need not be positioned as illustrated but any arrangement which will effect the heating of the interior of the respective inner chamber will suffice. In a further variation, particularly relevant to the embodiments illustrated in FIGS. 2 and 3, the doors of the inner and outer chambers can be integrated into a single, or interconnected, door assembly. Also, different valve arrangements are possible, particularly in respect of the means for emptying the apparatus. For example, the pump in the discharge pipe can be dispensed with if the vacuum pump can be arranged to provide an excess pressure in the outer or upper chamber. In such an arrangement, a spool valve may be provided in association with the vacuum pump to pressurise the apparatus and so force the collected condensed Water out through the discharge pipe when the valve therein is opened. Furthermore, the illustrative temperatures and pressures are not to be regarded as limitative. Further modifications and variations will be apparent to a skilled reader.

What is claimed is:

1. A drying apparatus comprising a first chamber for receiving articles to be dried and having a first outlet, a second chamber having a second outlet, a fan having a fan inlet and a fan outlet, the fan inlet communicating with the first outlet and the fan outlet communicating with the second chamber, a vacuum pump communicating with the second outlet, the first and second chambers, the fan and the vacuum pump being arranged such that transfer of thermal energy can take place between the first and second chambers, and a structure capable of causing forced circulation of water vapor contained within the first chamber.

2. The drying apparatus as claimed in claim 1, wherein the first and second chambers have at least one common wall, the common wall being thermally conductive.

3. The drying apparatus as claimed in claim 1 or 2, wherein the first chamber is located at least partially inside the second chamber.

4. The drying apparatus as claimed in claim 1 or 2, wherein the first chamber is located wholly within the second chamber.

5. The drying apparatus as claimed in claim 1 or 2, wherein the fan is arranged to discharge gas directly into the second chamber.

6. The drying apparatus as claimed in claim 1 or 2, wherein the second chamber comprises a water-collection region having an outlet for removing water from the second chamber.

7. The drying apparatus as claimed in claim 6, further comprising a pump provided in the outlet of the water-collection region.

8. The drying apparatus as claimed in claim 1 or 2, wherein the first chamber is mounted so as to be rotatable about an axis and further comprising a structure capable of causing the first chamber to rotate.

9. The drying apparatus as claimed in claim 8, wherein the fan comprises an array of vanes located radially outwardly of the first chamber, and further comprising a structure capable of causing the array of vanes to rotate.

10. The drying apparatus as claimed in claim 9, wherein the first chamber has a wall which is perforated at least in a region adjacent the array of vanes.

11. The drying apparatus as claimed in claim 1 or 2, wherein the first chamber comprises an outer housing and an inner drum for receiving the articles to be dried, the outer housing being mounted so as to be stationary with respect to the second chamber and the inner drum being rotatable with respect to the outer housing.

12. The drying apparatus as claimed in claim 11, wherein the inner drum comprises at least one vane or blade for causing circulation of air or water vapor within the first chamber when the drum is caused to rotate.

13. The drying apparatus as claimed in claim 12, wherein the inner drum is perforated in a region adjacent the at least one vane or blade.

* * * * *